United States Patent [19]

Vac

[11] Patent Number: 5,125,826

[45] Date of Patent: Jun. 30, 1992

[54] MOLD FOR PRODUCING THERMOPLASTIC PIECES BY BLOW PROCESS, WHICH PIECES ARE USED FOR STORING LIQUID AND SOLID MATERIALS

[75] Inventor: Marco A. Vac, Sao Paulo, Brazil

[73] Assignee: Industria E Comercio De Acumuladores Fulguris Ltda., Sao Paulo, Brazil

[21] Appl. No.: 667,886

[22] Filed: Mar. 12, 1991

[30] Foreign Application Priority Data

Mar. 20, 1990 [BR] Brazil .................. PI 9001284

[51] Int. Cl.$^5$ ............................ B29C 49/48
[52] U.S. Cl. ................... 425/522; 249/82; 249/155; 425/185; 425/526
[58] Field of Search ............ 425/522, 526; 249/82, 249/155, 158

[56] References Cited

U.S. PATENT DOCUMENTS

| 809,629 | 1/1906 | Pruett et al. ............... 249/155 X |
| 2,316,180 | 4/1943 | Mueller ..................... 249/82 X |
| 3,689,023 | 9/1972 | Peck ........................ 249/82 |
| 3,858,422 | 1/1975 | Tominaga et al. ............ 425/522 X |
| 3,888,453 | 6/1975 | Jeffreys .................... 249/82 |
| 4,637,789 | 1/1987 | Netznik .................... 249/158 X |
| 4,668,462 | 5/1987 | Smith ...................... 249/82 X |
| 4,815,960 | 3/1989 | Rudolph .................... 425/522 |

FOREIGN PATENT DOCUMENTS 1390634 4/1975 United Kingdom ................ 249/155

Primary Examiner—Richard L. Chiesa
Attorney, Agent, or Firm—Darby & Darby

[57] ABSTRACT

A mold for producing thermoplastic pieces by blow process, which pieces are used for storing liquid and solid materials, having two equal symmetrical parts (1) and (1'), each of which is formed by a vertical plate (2) and provided with extensions (3), adjacent the upper and lower edges of the plate (2). Screws (4) which are screwed into holes (5), provided in one lateral edge of another plate (6), and is allowed to slide along channels (7); the plate (2) is provided with a slit (8) through which the screw (9) passes over plate (6) and is screwed into the hole (10) provided on another plate (11) which is orthogonal to plates (2) and (6).

14 Claims, 4 Drawing Sheets

MOLD FOR PRODUCING THERMOPLASTIC PIECES BY BLOW PROCESS, WHICH PIECES ARE USED FOR STORING LIQUID AND SOLID MATERIALS

BACKGROUND OF THE INVENTION

As it is known in the prior art, for each type of piece to be obtained by thermoplastic blow molding process, as well as for each size change in a same type of piece, it is necessary to provide a specific mold exclusively designed for obtaining the predetermined type or model of piece having a predetermined size.

Such requirement essentially increases the manufacturing costs for the molded pieces, since the manufacturer has to own several molds and blowers.

BRIEF SUMMARY OF THE INVENTION

This invention is related to solving such problems and it refers to a mold which can be coupled to any blow molding machine for the manufacturing of pieces in generally parallelepipedal form having constant and predetermined heights, but having millimetrically varying sizes both in width and length thereof. Both vertical and horizontal edges of a parallelepiped can be rounded to make the wall thickness uniform or a sharp corner made thereby causing only partially such thickness to be non-uniform.

The mold of the invention is basically formed by lateral walls, or rule-guides, which are provided with a refrigerating system. The walls are mounted by screws on the outer side of the mold so that when the screw is turned in one direction or in another, said walls slide. This increases or reduces the width and/or the length of the lateral walls of the mold and consequently the molded piece to be obtained, and such adjustment can be manually or automatically made.

In addition, when pieces with rounded corners are to be produced, the end of one rule-guide is linked in order that it allows the piece to be drawn from inside the mold.

Therefore, by using only one mold, molded pieces in parallelepipedal form can be obtained, such as vessels for liquids, containers for batteries, vessels or flasks for acids, water and solids. These pieces can readily be sized in any width and length, thereby speeding up, facilitating and making the manufacture thereof much less onerous.

BRIEF DESCRIPTION OF THE DRAWINGS

For illustrative purposes only, the invention drawings are attached hereto to show the particulars thereof.

DETAILED DESCRIPTION OF THE PREFERRED EMBODIMENT

Figure 1:
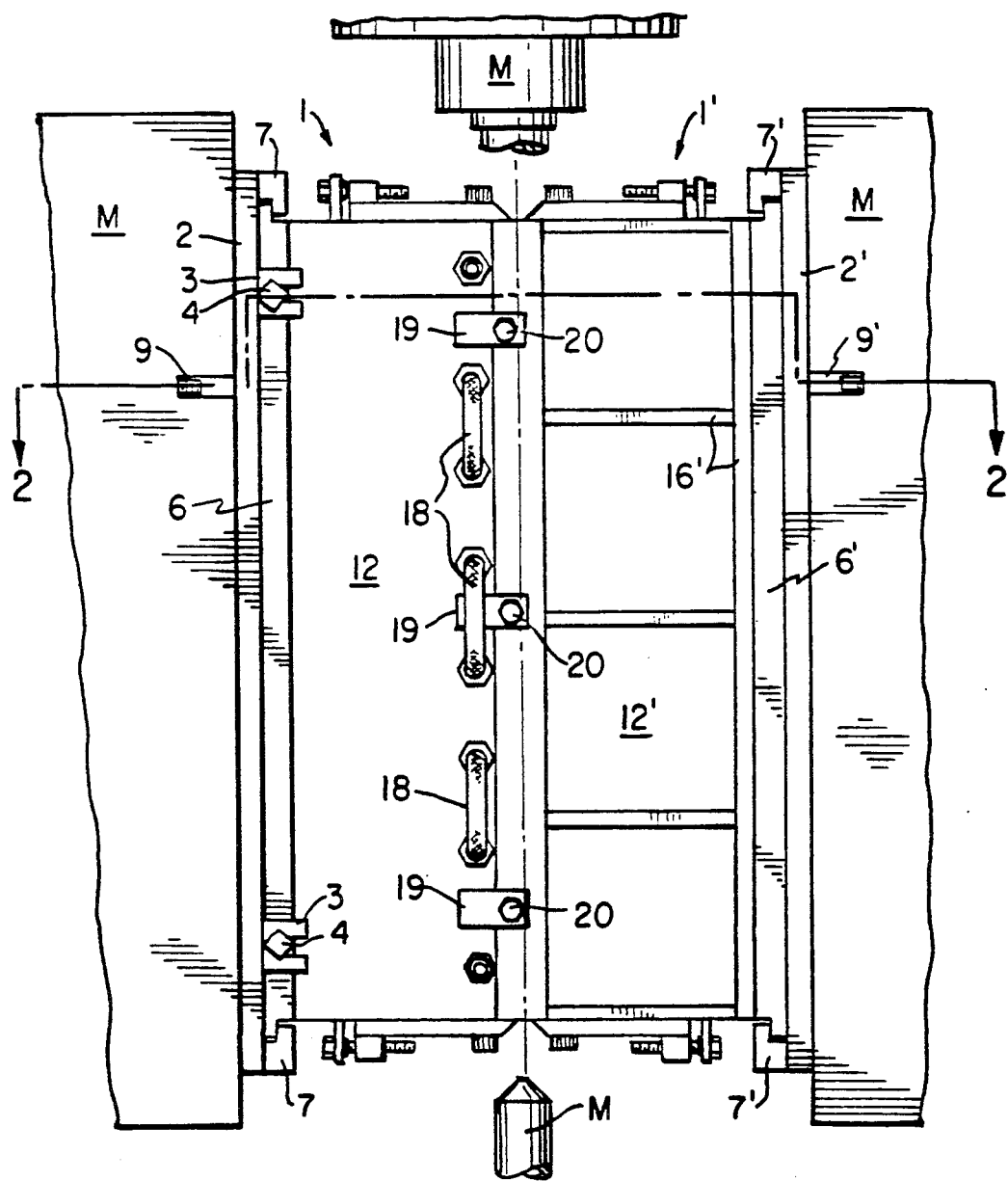
FIG. 1 is a front view of the mold shown coupled to the blow molding machine.
Figure 2:
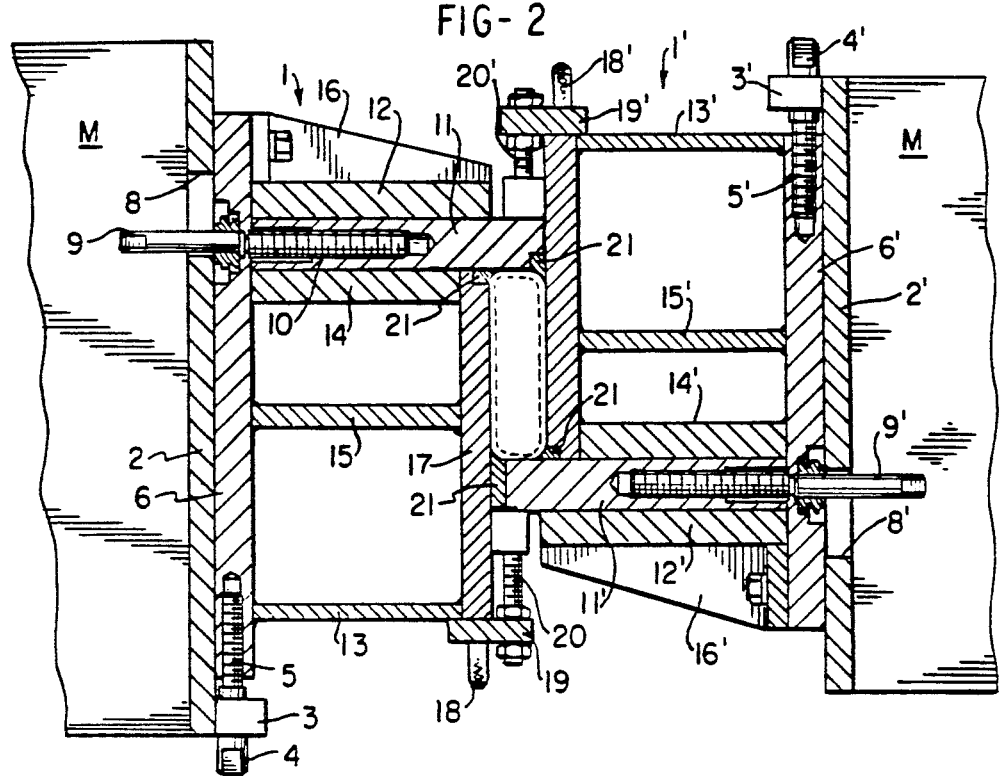
FIG. 2 is an upper sectional view of the mold in its closed position.
Figure 3:
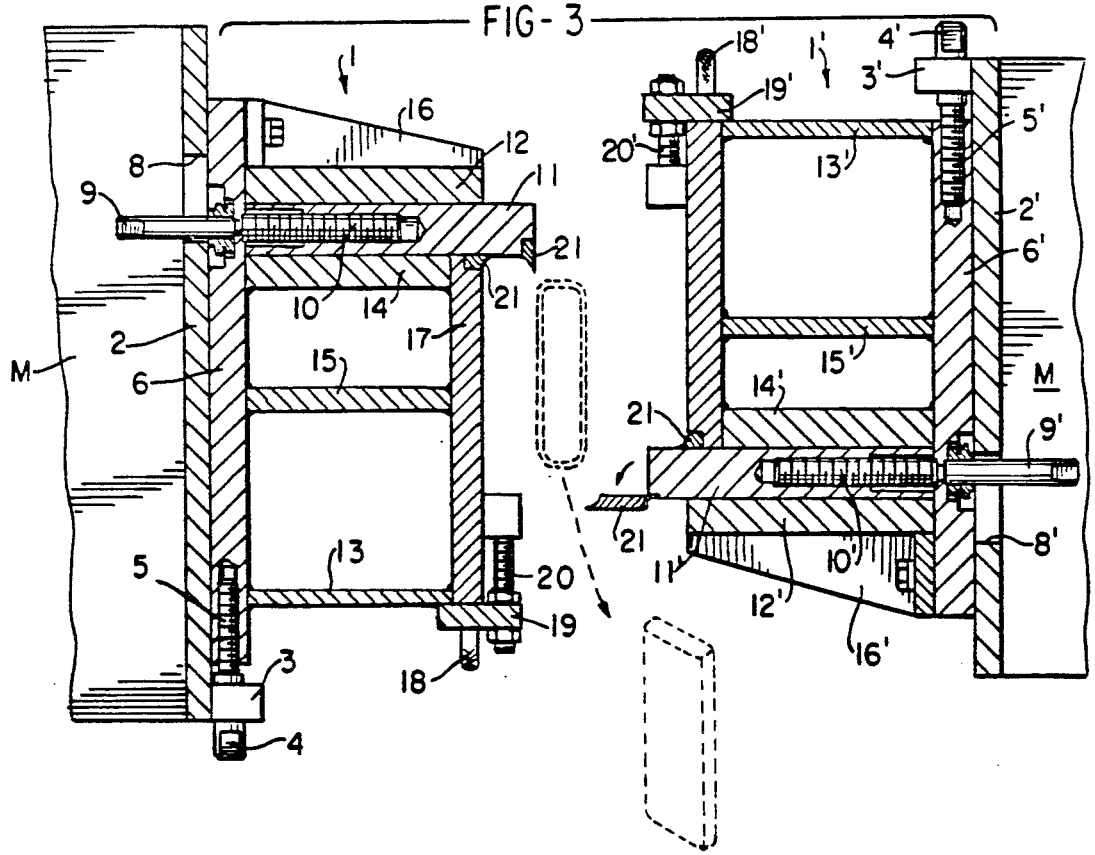
FIG. 3 is a similar upper sectional view of the mold but in its open position, the molded piece being drawn in phantom lines.
Figure 4:
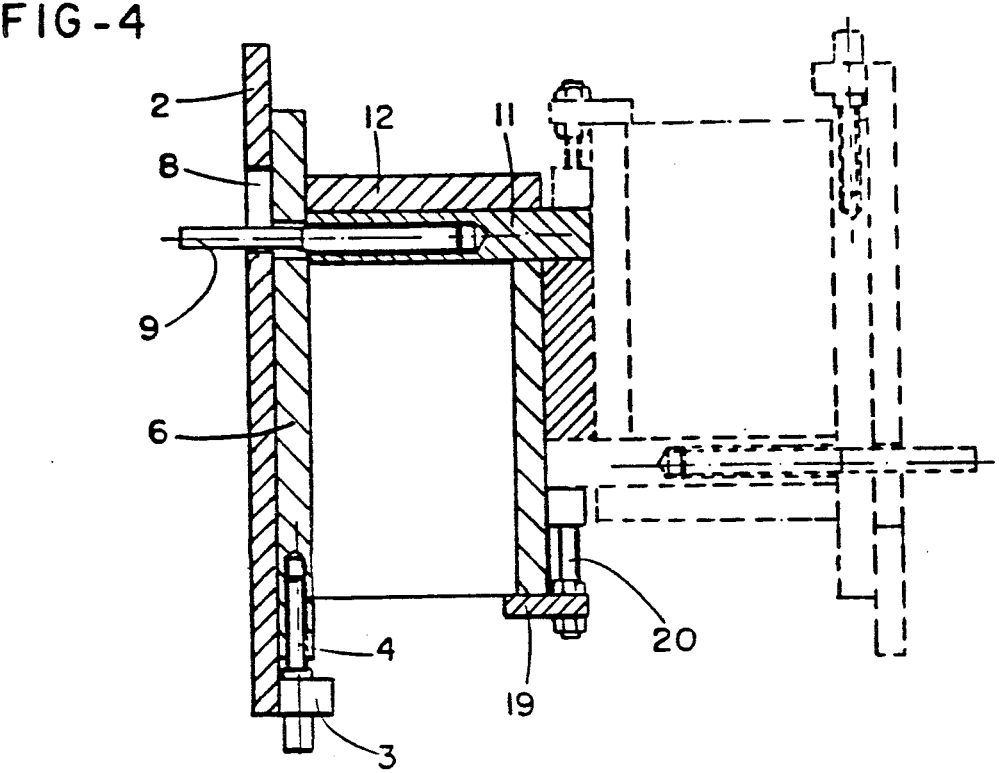
FIGS. 4 to 6 are schematic upper and sectional views of the mold showing some possible changes in the sizes of the pieces to be molded in said mold.
Figure 5:
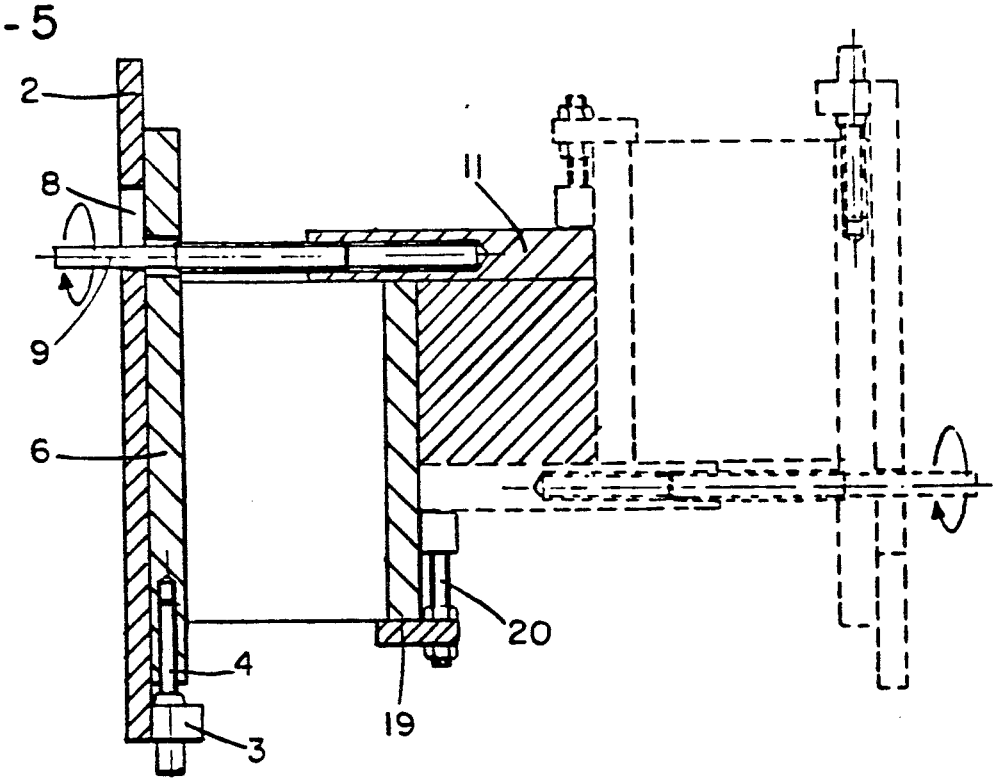
Figure 6:
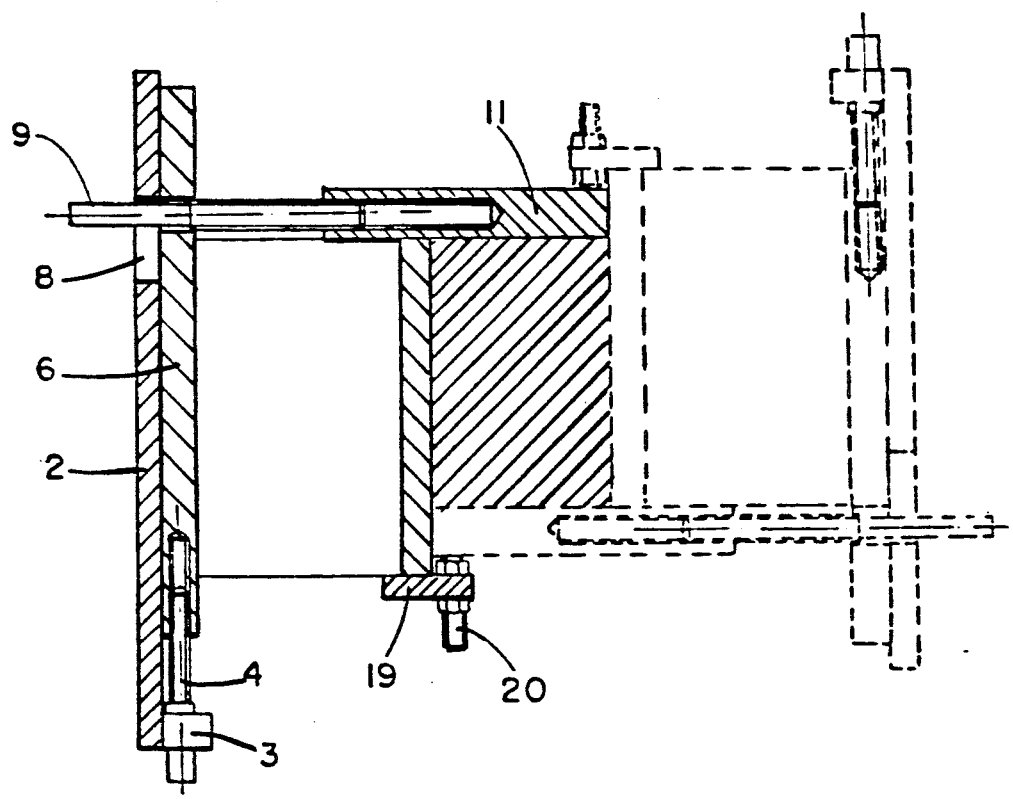

The mold is to be properly coupled to any blow molding machine (M), said mold being made up of two equal and symmetrical parts (1) and (1'). Only one part is described the other part with the pr_ld members being the same except where noted. One or both of the parts of the blow molding machine and other components and the mold parts (1, 1') connected thereto can be moved literally by any suitable means such as a manual or motorized system (not shown) toward or away from each other. This controls a thickness or length dimension of the plate. Each of the mold parts is formed by a vertical plate (2), which has been coupled to the blow molding machine (M). Each mold part (1, 1') is provided near one lateral edge thereof with two small extensions (3), adjacent the upper (on part 1') and lower (on part 1) edges of the plate (2). Long screws (4), threaded in the extensions (3) in turn are screwed into holes (5) provided in one lateral edge of another vertical plate (6). The screws (4) are part of a positioning mechanism which provides precise control of movement of the mold parts in a vertical direction. This can be manual or motor driven as is known in the art. A rule-guide (6), i.e. a pre-positioning mechanism, is provided parallel and adjacent to each of the first plate (2), with said rule guide. The rule guide (6) is allowed to slide horizontally along small channels (7) provided in the upper and lower ends of said plate (2) when said screws (4) are turned as hereinafter described. That is, rule guide (6) slide relative to the plates (2) which are fixed to the blow molding machine.

Each plate (2) is also provided, one (11) plate near its upper end and the other (11') near its lower end at the lateral portion thereof opposed to the extensions (3) with a slit (8), through which a screw (9) is passed. The screw (9) in its turn passes through the respective guide rule (6) and is screwed into a hole (10) provided on one lateral end of another plate (11). The plate (11) is orthogonal to the plates (2) and (6) and also form a rule-guide.

Attached to the guide rule (6) are orthogonal bracing plates, two of which are external (12) and (13) and two internal (14) and (15). The external bracing plate (12) has a width slightly larger than the internal ones and are in turn braced by several crossbars or brackets (16) attached by screws to the rule (6). The plates (12) and (14) form a channel-guide for the rule (11) to slide when the screw (9) is turned as hereinafter described. Screw (9) also can be of the precision type.

Interconnecting the bracing plates (13), (14) and (15) is a transverse plate (17) parallel to the rule guide (6). The internal lateral end of plate (17) is in contact with the internal face of the respective orthogonal rule (11), forming a 90° angle in relation to said internal face and forming together with said rule (11) two of the four lateral walls constituting the mold itself.

On the external lateral end of plate (17, 17') is a piping (18) for refrigerating the respective mold parts. Transverse connecting pieces (19) are attached, the free end of which passing over the respective plate (17) is passed over by the screw (20) which is substantially long. The free end of screw (20') faces towards the interior of the mold to form the backstop for the rule-guide (11') provided on the half portion (1') of the mold.

The edges of the mold made up by the rules (11) and (11') and the plates (17) and (17') can be rounded by providing several small pieces (21) basically parallelepipedal in form with one rounded face thereof. One of the pieces (21) provided on the end of one of said rule (11) or (11') is removable to allow the mold to open after the piece is molded and thereby the piece is not damaged.

In operation, to control both the width and the length of the parallelepiped as desired and bounded by said mold, the screws (4) and (4') are adjusted in one direction or another. This causes the rule guide (6) and (6') to slide along the small channels (7) and (7'). When the rule guide (6) and (6') are moved, the assemblies formed by the rule (11) and wall (17) and the rule (11') and wall (17') are also moved. Adjusting the screws (9) and (9') in one direction or another moves the rules (11) and (11'), respectively. The mold parts (1)(1') also can be adjusted selective to each other to control another dimension of the product.

I claim:

1. A mold apparatus for producing three-dimensional thermoplastic pieces comprising:
   first and second mold parts each having means for setting a first dimension of said pieces and a mounting plate, the mounting plates being generally parallel and having side guides,
   a respective first rule guide attached to each said mounting plate, the side guides of the two mounting plates opposing each other,
   a respective first mold member attached to each first rule guide, the first mold members all being generally parallel,
   means for moving each said first rule guide and the first mold member attached thereto parallel to its respective mounting plate to set a second dimension of the pieces as formed by said first mold members generally orthogonal to said first dimension,
   a respective second rule guide attached generally orthogonally to each said first rule guide, the said second rule guides being generally parallel to each other,
   a respective second mold member on said second rule guide,
   means for moving each said second rule guide and the second mold member orthogonally with respect to the first rule guide to which it is attached to set a third dimension of the pieces orthogonal to both said first and second dimensions as formed by said second mold members, the first and second mold members defining a generally rectangular mold configuration in the second and third dimensions for one of the thermoplastic pieces to be molded.

2. A mold apparatus as in claim 1, wherein said means for moving at least one of said first rule guides provides bi-directional movement thereto, 3. A mold apparatus as in claim 2, wherein said means for moving at least one of said second rule guides provides bi-directional movement thereto.

4. A mold apparatus as in claim 2, wherein said means for moving each said second rule guide provides bi-directional movement thereto.

5. A mold apparatus as in claim 2, wherein said means for moving each said first rule guide provides bi-directional movement thereto.

6. A mold apparatus as in claim 5, wherein said means for moving each said second rule guide provides bi-directional movement thereto.

7. A mold apparatus as in claim 1, wherein said moving means for at least one of said first rule guide comprises a first part mounted to the mounting plate of said first rule guide and a second part coacting with said first rule guide.

8. A mold apparatus as in claim 7, wherein said moving for said at least one second rule guide comprises a first part mounted to the first rule guide to which said at least one second guide is attached and a second part coacting with said at least one second rule guide.

9. A mold apparatus as in claim 8, wherein said moving means for said at least one second rule guide further comprises a third part for moving said second part, said third part extending through an opening in the plate to which said first rule guide is mounted.

10. A mold apparatus as in claim 1, further comprising a mold insert on the end of at least one of said first and second mold members having a curved inner surface.

11. A mold apparatus as in claim 1, further comprising a mold insert at the end of each of said first and second mold members, each said insert having a curved inner surface to form rounded corners for one of the thermoplastic pieces.

12. A mold as in claim 1, wherein the edges of the mold made up by the rule-guides and the plates are rounded by providing at least one small piece basically parallelepipedal in form with one rounded inner face thereof, and one of the small pieces provided on the end of each of said rule-guides is linked to allow the mold to open after the piece is molded.

13. A mold for producing thermoplastic pieces by blow molding process, said pieces are used for storing liquid and solid materials, said mold is to be coupled to a blower (M), said mold comprising a pair of symmetrical parts (1, 1'),
   one of said mold parts having a vertical plate (2) coupled to the blower (M) and provided on one lateral rim thereof with extensions (3) adjacent the upper and lower rims of the plate (2) through which a screw (4) passing with its end being screwed into a hole (5) on one of the lateral rims of another plate (6) which forms a rule-guide provided in parallel and adjacent to the first one, said rule-guide (6) having a width slightly smaller than that of its plate (2) and sliding along channels (7) provided adjacent the upper and lower rims thereof when the screws (4) are turned,
   said vertical plate (2) being further provided next to its upper rim and the lateral rim opposed to the extensions (3) with a slot (8) through which another screw (9) passes, which in its turn passes through the rule-guide (6) and is screwed into the hole (1) provided on one of the lateral rims of said another plate (11) being orthogonal to the plates (2, 6), and also forming a rule-guide;
   orthogonal bracing plates attached to the rule-guide (6), with two outer plates (12, 13) and two inner plates (14, 15), one of the outer external bracing plates (12) having a width slightly larger than other ones is braced by several crossbars (16), attached to the rule-guide (6) by screws,
   said one of the outer bracing plates (12) and one of said inner plates (14) forming a channel-guide for sliding an orthogonal rule (11) when the another screw (9) is turned; thereby interconnecting the bracing plates (13, 14, 15),
   still another plate (17) is parallel to the rule-guide (6), the internal lateral rim of which is in contact with the internal face of the orthogonal rule (11), bounding a 90° angle in relation to said internal face, and forming together with said rule (11), two of the four lateral walls comprising the mold itself;
   a piping on the external lateral rim of said still another plate (17) for refrigerating said mold, transverse connecting pieces (19) are attached, so that the free end of which passing over the said still another plate (17) is passed over by a still another screw (20) which is substantially long and the free end of which faced towards the interior of the mold comprises the backstop for another rule (11') provided on one of the symmetrical parts (1') of the mold.

14. A mold as in claim 13, wherein the edges of the mold made up by the rules (11, 11') and the respective said still another plates (17, 17') are rounded by providing some small pieces (21) basically parallelepiped in form with one rounded inner face thereof, and one of the small pieces (21) provided on the end of one of said rules (11, 11') is linked to allow the mold to open after one of said thermoplastic pieces is molded.

* * * * *